METHOD OF REPAIRING CRACKED CASTINGS

Filed Sept. 15, 1952

INVENTORS
LEWIS W. WELCH
ALBERT FEGEL
BY Whittemore, Hulbert & Belknap
ATTORNEYS United States Patent Office 2,751,671
Patented June 26, 1956

2,751,671

METHOD OF REPAIRING CRACKED CASTINGS

Lewis W. Welch and Albert Fegel, Los Angeles, Calif., assignors to Novi Equipment Company, Novi, Mich., a corporation of Michigan Application September 15, 1952, Serial No. 309,646
3 Claims. (Cl. 29—402)

The present invention relates to a method of repairing castings, and more particularly, to a method of repairing cracks in a motor block extending laterally from an opening therein, such for example as a cylinder. The crack may for example extend between a cylinder and an adjacent passage or may extend from a cylinder to an outer side of the block.

It is an object of the present invention to provide means for repairing such cracks characterized by its simplicity and effectiveness.

More specifically, it is an object of the present invention to provide a method of repairing cracks which comprises the steps of forming a cut coinciding with the crack of such width as to remove the surface irregularities of the crack, thereafter inserting a strip of malleable material and impacting projecting ends of the strip to upset material thereof within a slot.

Still more specifically, it is an object of the present invention to provide a method of repairing cracks of the character described which comprises the steps of initially applying forces to cause perceptible separation between opposed surfaces of the crack, thereafter cutting a slot of substantial width in coincidence with the crack to remove surface irregularities thereof, thereafter forcing into the slot a strip of malleable metal designed to fit snugly therein, thereafter releasing the forces tending to cause separation of the sides of the crack to cause the side surfaces of the slot to press strongly against the sides of the strip, thereafter hammering or impacting projecting ends of the strip to cause upsetting of the malleable metal thereof within the confines of the slot, and finally machining one or more of the upset projecting ends of the strip.

Other objects and features of the invention will become apparent as the description proceeds, especially when taken in conjunction with the accompanying drawings, wherein.

Under certain conditions of usage cracks appear in motor blocks, generally from a cylinder therein to an adjacent passage or to a side surface of the block. These cracks normally appear at the head end of the block and require repair to maintain adequate sealed condition. The present invention relates to a method of repairing such cracks but is not however limited to the repairing of cracks appearing in motor blocks. Instead, the present invention is capable of use in repairing cracks in a wide variety of bodies, castings, or other parts. However, for simplicity the invention will be described in detail as applied to the repair of a crack extending between a cylinder and an adjacent passage at the head end of a motor block.

Figure 1:
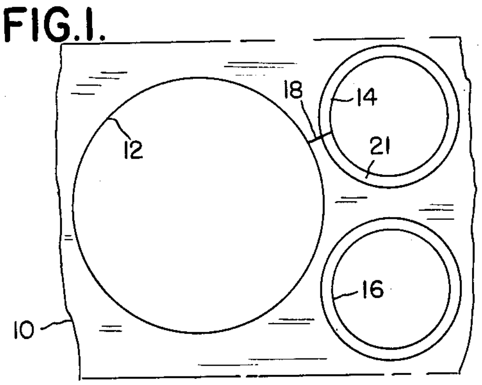
Figures 1–7 are fragmentary diagrammatic elevational views illustrating steps in the repair of a crack in a motor block.
Figure 8:
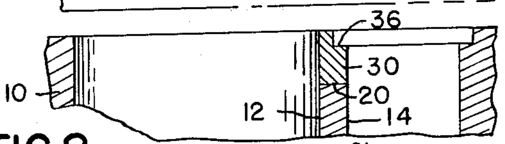
Figures 8 and 9 are fragmentary sectional views illustrating the final steps in the method.
Figure 9:
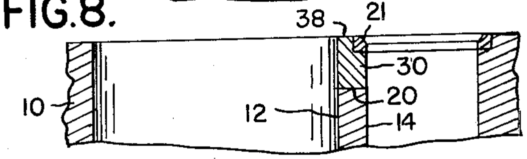

Referring now to the drawings, there is shown at 10 a fragmentary portion of a motor block having therein a cylinder 12 and a pair of passages 14 and 16 adjacent thereto. As seen in Figure 1, a crack appears at 18 which extends between the cylinder 12 and the passage 14. This crack may extend downwardly from the head of the block a substantial distance such for example as to slightly above a line 20 as seen in Figures 8 and 9. Normally the passages 14 and 16 are valve passages and include removable valve seats 21 of the type best illustrated in Figure 9.

Figure 2:
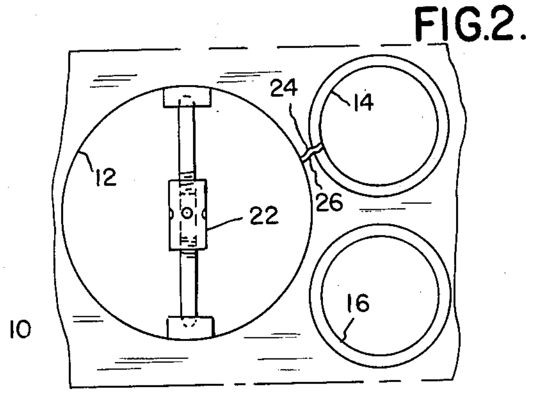
Figure 3:
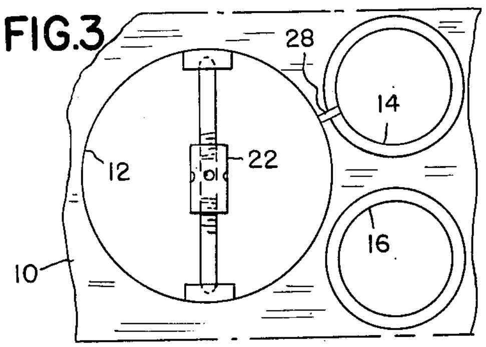

In order to repair the crack 18 the valve seat 21 is first removed and forces are applied internally of the cylinder 12 and this may be accomplished as illustrated in Figure 2 by providing an extensible jack 22 therein which develops forces tending to separate the opposed surfaces 24 and 26 of the crack. These surfaces are separated an extremely small but nevertheless perceptible distance. No exactitude is required in producing the separation between these surfaces but in general the separation resulting is perceptible to the naked eye and is a few thousandths of an inch.

With the jack 22 remaining in position thus maintaining the surfaces 24 and 26 of the crack separated, a slot 28 is cut in coincidence with the crack and of such thickness as to remove surface irregularities of the crack. Generally, speaking, the slot 28 will be about 3/32" wide and it is cut to a depth sufficient to go beyond the bottom of the crack. The slot is conveniently produced by a sawing operation which produces a cut having substantially smooth flat sides and a smooth bottom.

Figure 4:
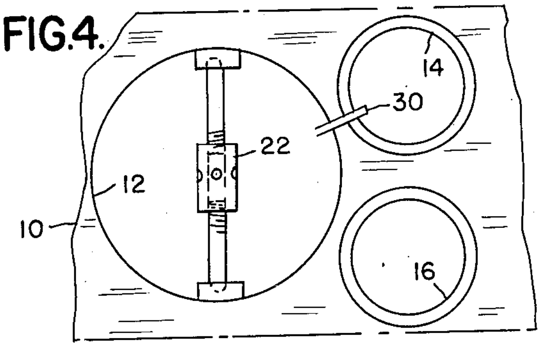

Thereafter, a strip of malleable metal is forced into the slot in close fitting relation thereto. This strip may conveniently be 3/32" stock of cold rolled sheet steel, preferably a mild steel which is relatively malleable. The strip is illustrated at 30 in Figure 4 and is shown as having its end portions extending substantially beyond the ends of the slot into the cylinder 12 and passage 14. Preferably, the width of the strip is such that an edge of the strip extends slightly above the top of the block 10 and the strip is hammered downwardly so that its lower edge conforms itself to the bottom surface of the slot and so that material of the strip is to some extent upset within the confines of the slot.

At this time the jack 22 is removed thus relieving the forces tending to cause expansion of the cylinder and the material of the block thereupon is forced strongly against the sides of the strip 30.

Figure 5:
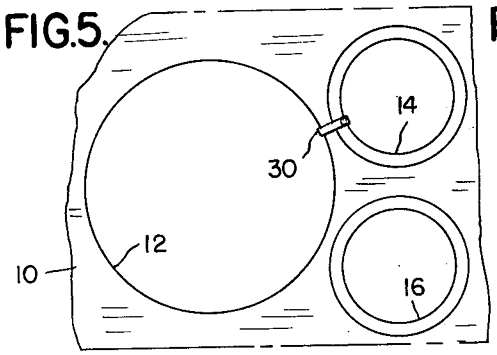

Thereafter, the projecting ends of the strip 30 are cut away so as to leave relatively small amounts of the strip extending into the cylinder 12 and passage 14 as illustrated in Figure 5. Conveniently, the amount of stock left at this time may be approximately .030".

Figure 6:
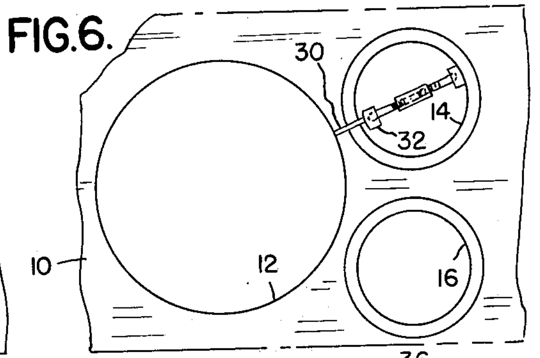
Figure 7:
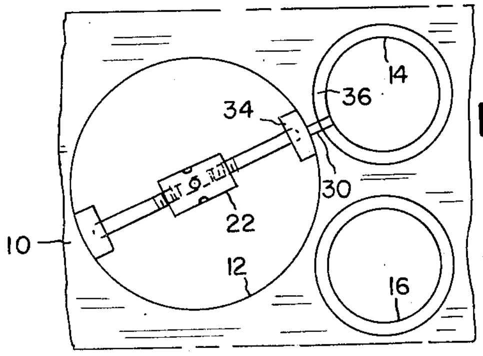

The next step in the operation is to impact the ends of the strip 30 and this is accomplished by inserting an anvil 32 so as to engage one end of the strip 30 while the opposite end thereof is hammered. Hammering the end of the strip in the cylinder 12 as illustrated in Figure 6, results in upsetting of the material of the malleable strip within the confines of the slot as well as in producing a small rivet head within the cylinder 12.

Thereafter, a similar anvil 34 is supported within the cylinder 12 and the end of the strip 30 within the passage 14 is similarly impacted or hammered to again produce upsetting of the material of the malleable strip within the confines of the slot and the production of a small rivet head within the passage 14. Obviously, either end of the strip 30 may be impacted first or in some cases with suitable arrangements, hammer blows may be delivered simultaneously to opposite ends of the strip 30.

Following impacting of the ends of the strip as above described, the riveted material within the cylinder 12 and the passage 14 is machined away to produce the arrangement illustrated in Figure 8. In this figure it will be observed that the material of the strip 30 is now machined to form a groove 36 for the reception of the valve seat 21.

In Figure 9 there is illustrated the final repaired cylinder in which the valve seat 21 has been replaced in such a way as to form means for locking the strip 30 in its final position.

It will of course be appreciated that the invention as just described in detail is related primarily to the repair of motor blocks and that for certain purposes some of the steps may be omitted. Thus for example, where the repair is carried out on a body or casting in which the crack did not extend to a machined operating surface, the final step of removing riveted material of the inserted strip need not be carried out. However, in the case of motor blocks it will be desirable to machine the inner surface of the cylinder 12 and the surface of the passage 14 as well as machining the top surface 38 of the block to permit proper sealing when the head is replaced.

It will be observed that the operation of repairing the crack is intended primarily as producing an adequate seal and does not restore the structural strength of the part. From this point of view the invention is limited to the repair of cracks which are not extensive enough to destroy the utility of the casting by reason of weakening it. The use of the malleable steel in the insert strip followed by impacting or hammering of projecting portions thereof produces an actual upsetting of the metal of the strip within the confines of the slot so as to produce a highly efficient seal.

While the foregoing method, which has been described in detail, is preferred for many reasons, somewhat equivalent results may be obtained by cutting the slot in coincidence with the crack prior to the application of the jack to spread the surfaces. Alternatively, in some cases adequate results may be obtained in which the spreading step is completely omitted and the smooth sided accurately formed slot is cut in coincidence with the crack, after which a properly dimensioned strip is forced into the slot. However, as indicated above, best results are obtained when the uneven surfaces of the crack are first spread and the slot is thereafter sawed in coincidence with the crack.

The drawings and the foregoing specification constitute a description of the improved method of repairing cracked castings in such full, clear, concise and exact terms as to enable any person skilled in the art to practice the invention, the scope of which is indicated by the appended claims.

What we claim as our invention is:

1. The method of repairing a motor block having a crack extending transversely thereof between a cylinder and an adjacent valve passage containing a removable valve seat, comprising the steps of removing the valve seat from said passage, applying internal pressure in the cylinder generally perpendicular to the direction of the crack to separate the opposed surfaces of the crack apart a perceptible amount, cutting a smooth surfaced slot to coincide with the crack to remove the surface irregularities of the crack, forcing into the slot a strip of malleable steel adapted to fit snugly therein to fill the slot and to extend beyond the ends and open side of the slot, relieving said internal pressure, impacting the projecting portions of the strip to upset material of the strip within the slot, machining the impacted strip to remove therefrom any remaining portions thereof within the interior of the cylinder and passage and to form a groove for the valve seat, and replacing the valve seat within said groove.

2. The method of repairing a cracked motor block having a crack extending transversely thereof between a cylinder and an adjacent valve passage containing a removable valve seat, comprising the steps of removing the valve seat from the passage, applying forces diametrically of the cylinder in a direction substantially at right angles to the crack to spread the opposed surfaces of the crack apart, cutting a smooth surfaced slot to coincide with the crack while maintaining the opposed surfaces thereof spread apart to remove surface irregularities of the crack, forcing downwardly into said smooth surfaced slot a strip of malleable steel of such size and configuration that it will fit snugly in and fill the slot and will project beyond the ends of said slot, relieving the cylinder of the forces aforesaid to cause opposite sides of the slot to bear firmly against opposite sides of said steel strip, cutting away the projecting portions of said steel strip so as to leave relatively small portions of the strip projecting into the cylinder and passage respectively, impacting the small projecting portions of said strip to upset the material of the strip within the slot and to produce relatively small rivet heads within the cylinder and passage respectively, machining away the rivet heads so formed within the cylinder and passage, machining said strip to form a groove therein for the removed valve seat, and replacing said valve seat within said groove.

3. The method of repairing a cracked motor block having a crack extending transversely thereof between a cylinder and an adjacent valve passage containing a removable valve seat, comprising the steps of removing the valve seat from the passage, applying forces diametrically of the cylinder in a direction substantially at right angles to the crack to spread the opposed surfaces of the crack apart, cutting a smooth surfaced slot to coincide with the crack while maintaining the opposed surfaces thereof spread apart to remove surface irregularities of the crack, forcing downwardly into said smooth surfaced slot a strip of malleable steel of such size and configuration that it will fit snugly in and fill the slot and will project beyond the ends of said slot, relieving the cylinder of the forces aforesaid to cause opposite sides of the slot to bear firmly against opposite sides of said steel strip, impacting the projecting portions of said strip to upset the material of the strip within the slot and to produce relatively small rivet heads within the cylinder and passage respectively, machining the impacted strip to remove therefrom any remaining portions thereof projecting into the cylinder and passage and to form a groove for the valve seat, and replacing said valve seat within said groove.

References Cited in the file of this patent

UNITED STATES PATENTS

| | | |
|---|---|---|
| 1,322,245 | Klassen | Nov. 18, 1919 |
| 1,397,167 | Hopper | Nov. 15, 1921 |
| 1,989,695 | Jensen | Jan. 5, 1935 |
| 2,011,484 | Harman | Aug. 13, 1935 |
| 2,198,167 | Harman | Apr. 23, 1940 |
| 2,252,986 | Scott | Aug. 19, 1941 |
| 2,369,415 | Sherman | Feb. 13, 1945 |
| 2,711,012 | Harman | June 21, 1955 |